(12) United States Patent
Nakamura et al.

(10) Patent No.: US 6,710,872 B1
(45) Date of Patent: Mar. 23, 2004

(54) SYSTEM FOR SPECTROMETRY

(75) Inventors: Koji Nakamura, Kyoto (JP); Fumiko Osumi, Kyoto (JP); Hidetsugu Matsushita, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 375 days.

(21) Appl. No.: 09/660,592

(22) Filed: Sep. 13, 2000

(30) Foreign Application Priority Data

Dec. 27, 1999 (JP) .............................. 11-369177

(51) Int. Cl.⁷ .............................. G01J 3/28; G06T 11/20
(52) U.S. Cl. ........................................ 356/326; 345/440
(58) Field of Search ............................ 356/326; 345/440

(56) References Cited

U.S. PATENT DOCUMENTS

| | | | | |
|---|---|---|---|---|
| 5,633,997 A | * | 5/1997 | Barber et al. ............... | 345/440 |
| 5,760,785 A | * | 6/1998 | Barber et al. ............... | 345/440 |
| 5,991,023 A | * | 11/1999 | Morawski et al. .......... | 356/326 |
| 6,512,582 B1 | * | 1/2003 | Mori et al. ................. | 356/308 |

* cited by examiner

*Primary Examiner*—Russell Adams
*Assistant Examiner*—Andrew T Sever
(74) *Attorney, Agent, or Firm*—Beyer Weaver & Thomas LLP

(57) ABSTRACT

A system for spectrometry includes an input device, a measuring device with a spectrophotometer, a calculating device and an output device for outputting results of calculations by the calculating device. The input device allows a user to input target wavelengths at which spectrometric measurements are to be carried out, character arrays representing variables assigned to measured values which are to be stored, and character arrays representing calculation formulas created according to specified rules. The measuring device serves to measure a sample spectrometrically with the spectrophotometer to obtain measured values at the inputted target wavelengths. The calculating device analyzes the character arrays representing the calculating formulas and carries out calculations of the calculating formulas by replacing any of the character arrays representing the variables, if contained in the calculating formulas, each by corresponding one of the measured values.

2 Claims, 5 Drawing Sheets

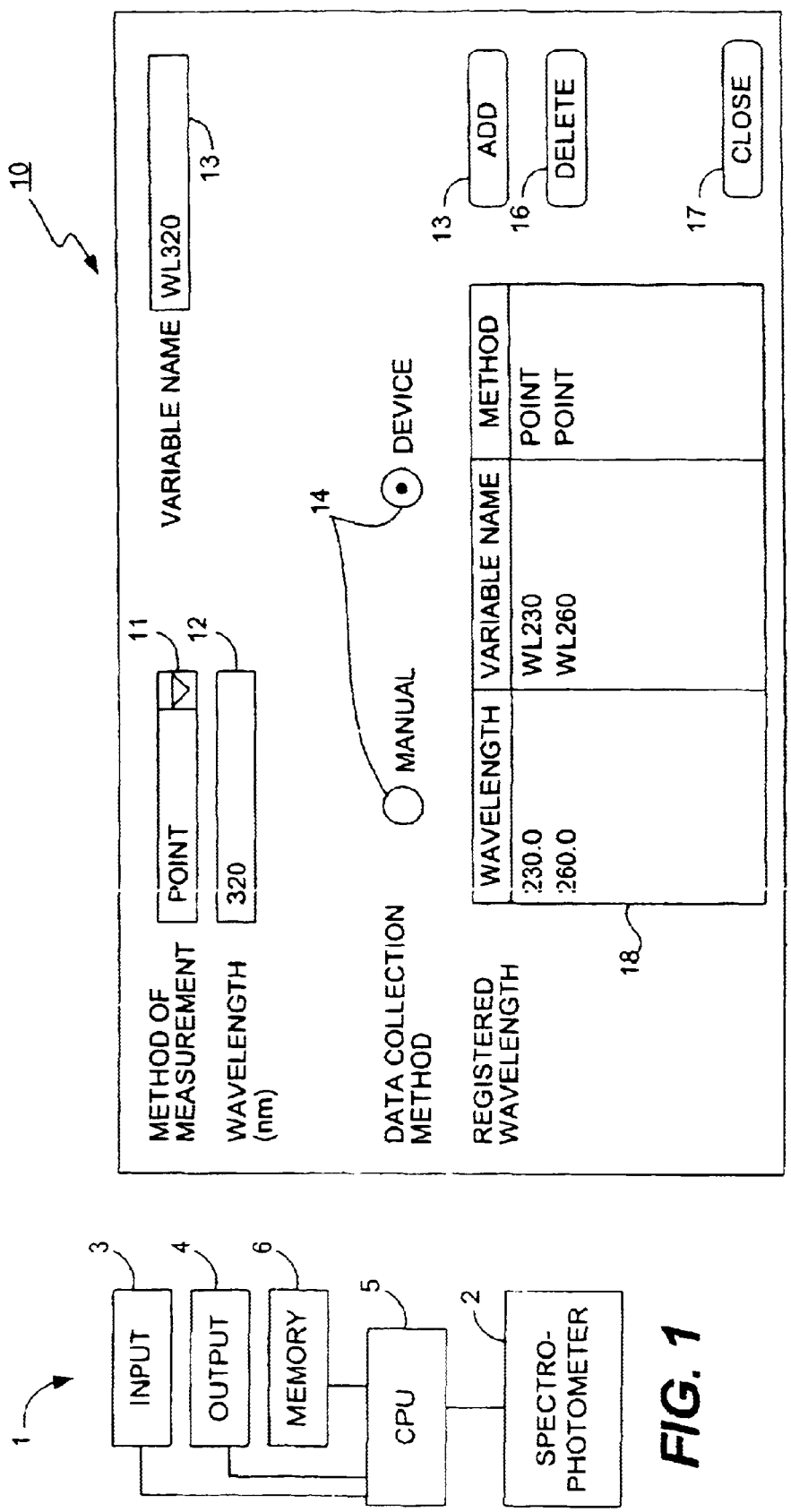

FIG. 3

| SAMPLE ID | KIND | WL260 | WL230 | WL320 | corr260 | corr230 | 260_230_ratio | DNA_equl | Protein |
|---|---|---|---|---|---|---|---|---|---|
| 1 | UNKNOWN | 0.270 | 0.503 | 0.002 | 0.268 | 0.501 | 0.534 | 11.401 mg/l | 71.373 mg/l |
| 2 | UNKNOWN | 0.261 | 0.593 | 0.001 | 0.260 | 0.592 | 0.440 | 10.708 mg/l | 88.537 mg/l |
| 3 | | | | | | | | | |
| 4 | | | | | | | | | |
| 5 | | | | | | | | | |

PRINT 48    SAVE 49

SYSTEM FOR SPECTROMETRY

BACKGROUND OF THE INVENTION

This invention relates to a system for spectrometry which includes a spectrophotometer and in particular to a control unit for processing the data obtained by the spectrophotometer.

Many of the currently used systems for spectrometry comprise a spectrophotometer and a control unit which are provided as two separate components. The spectrophotometer is a hardware instrument for spectrophotometry and includes a light source, a spectroscope, a sample stage (or a sample holder) and a photo-detector. The control unit is for controlling the operation of the spectrophotometer and processing output signals from the spectrophotometer. The recent trend is to form a control unit with a variety of functions by running control programs for spectrometry on a multi-purpose personal computer.

The functions of such a control unit include the following. Before a measurement, a user interface is provided through which the user is required to select and set parameters related to the measurement such as the wavelength and the method of measurement (such as the point measurement and the scan measurement) and signals corresponding to such parameters are transmitted to the spectrophotometer. During the measurement, the control unit controls the operations of the individual parts of the spectrophotometer according to a specified time schedule, collects the output signals from the spectrophotometer and stores in a memory device data obtained therefrom. After the measurement, the data obtained by the measurement are processed in order to calculate the transmissivity and the absorptivity of the sample and the results of such calculations are outputted through an output device such as a display or a printer.

A system for spectrometry can be used not only for investigating the absorption characteristics of a sample in analytical chemistry but also in a variety of other fields. In the production of optical filters, for example, it is necessary to measure the transrnissivity of the produced filters to check whether they indeed have the predetermined value or below and a system for spectrometry can be used for such a test. In a research in biochemistry, as another example, a system for spectrometry may be used for measuring the concentration of a specified component. If the absorptivity of a certain sample is known at wavelengths 260 nm and 230 nm, for example, the concentrations of nucleic acids (such as DNA and RNA) and protein contained in the sample can be obtained by carrying out a certain calculation using these values.

Prior art control units of a system for spectrometry have the function of outputting the transmissivity and absorptivity at a specified target wavelength to an output device but are not provided with the function of carrying out calculations or making judgments by using values of transmissivity or absorptivity. In order to carry out such calculations or to make judgments, therefore, the user had to himself/herself carry out calculations or make judgments on the basis of the results of measurements outputted to the output device or to prepare a program for processing the results of measurements and to carry out the troublesome task of transferring the data on the results of measurements from the control program for spectrometry to this prepared program.

SUMMARY OF THE INVENTION

It is therefore an object of this invention, in view of the problem described above, to provide an improved system for spectrometry having the function of carrying out calculations by using measured values such as transmissivity and absorptivity obtained as a result of spectrometry.

It is also an object of this invention to provide a method for spectrometry having such function.

A system for spectrometry embodying this invention, with which the above and other objects can be accomplished, may be characterized not only as comprising an input device, a measuring device with a spectrophotometer to obtain measured values, a calculating device and an output device for outputting results of calculations by the calculating device but also wherein the input device allows a user to input target wavelengths at which spectrometric measurements are to be carried out, character arrays representing variables assigned to measured values which are to be stored, and character arrays representing calculation formulas created according to specified rules and the calculating device analyzes the character arrays representing the calculating formulas and carries out calculations of the calculating formulas by replacing any of the character arrays representing the variables, if contained in the calculating formulas, each by corresponding one of the measured values.

A control unit having various functions for spectrometry for such a system according to this invention may be formed, for example, by installing a multi-purpose operating system (OS) into a personal compute equipped with an input device (such as a keyboard or a mouse), a display device (such as a CRT or an LCD), a central processing unit (CPU) and memory devices (such as ROM, RAM and HDD) and running a specified program on this operating system. This control unit serves to display formula-generating screens (such as the screens for generating calculation formulas and judgment formulas) on the display device when the user carries out a certain operation on the input device. It is on such screens that the user inputs through the input device not only the target wavelength at which spectrometry is to be carried out but also the names of the variables where measured values (say, of absorptivity and transmissivity) at this target wavelength are to be stored. In addition, the user generates formulas for calculations from the input device according to certain rules and registers these formulas in the system. In general, the formulas (or expressions) for calculations are formed by using elements including calculation operators (arithmetic operators +, −, * and /), comparison operators (>, <, =, etc.), logical operators (&, |, !=, AND, OR, NOT, etc.), character arrays indicating constants and variables defined by the user, character arrays representing constants and variables installed in the system, and numerical values expressed by Arabic numerals.

After a target wavelength, variable names and operation expressions are inputted, the user sets a sample at a specified position in the system and inputs an execute command for starting spectrometry. When this command is received, the system carries out the measurement of the sample by means of the spectrophotometer of its measuring device and obtains measured values at the specified target wavelength. After the measured values are obtained, the calculating means of the system carries out calculations by analyzing the earlier inputted character arrays in the operation expressions. In this operation, the calculations are done by replacing the variable names contained in the character arrays of the operation expressions by measured values which have been obtained. After a result of calculation is obtained, the output means of the system outputs it in a form recognizable by the user.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a schematic block diagram of a system embodying this invention for spectrometry;

FIG. 2 is a wavelength setting screen displayed on the output device in the system of FIG. 1;

FIG. 3 is a calculation formula preparing screen displayed on the output device;

FIG. 5 is a table displaying the results of measurements and calculations;

DETAILED DESCRIPTION OF THE INVENTION

Figure 3:
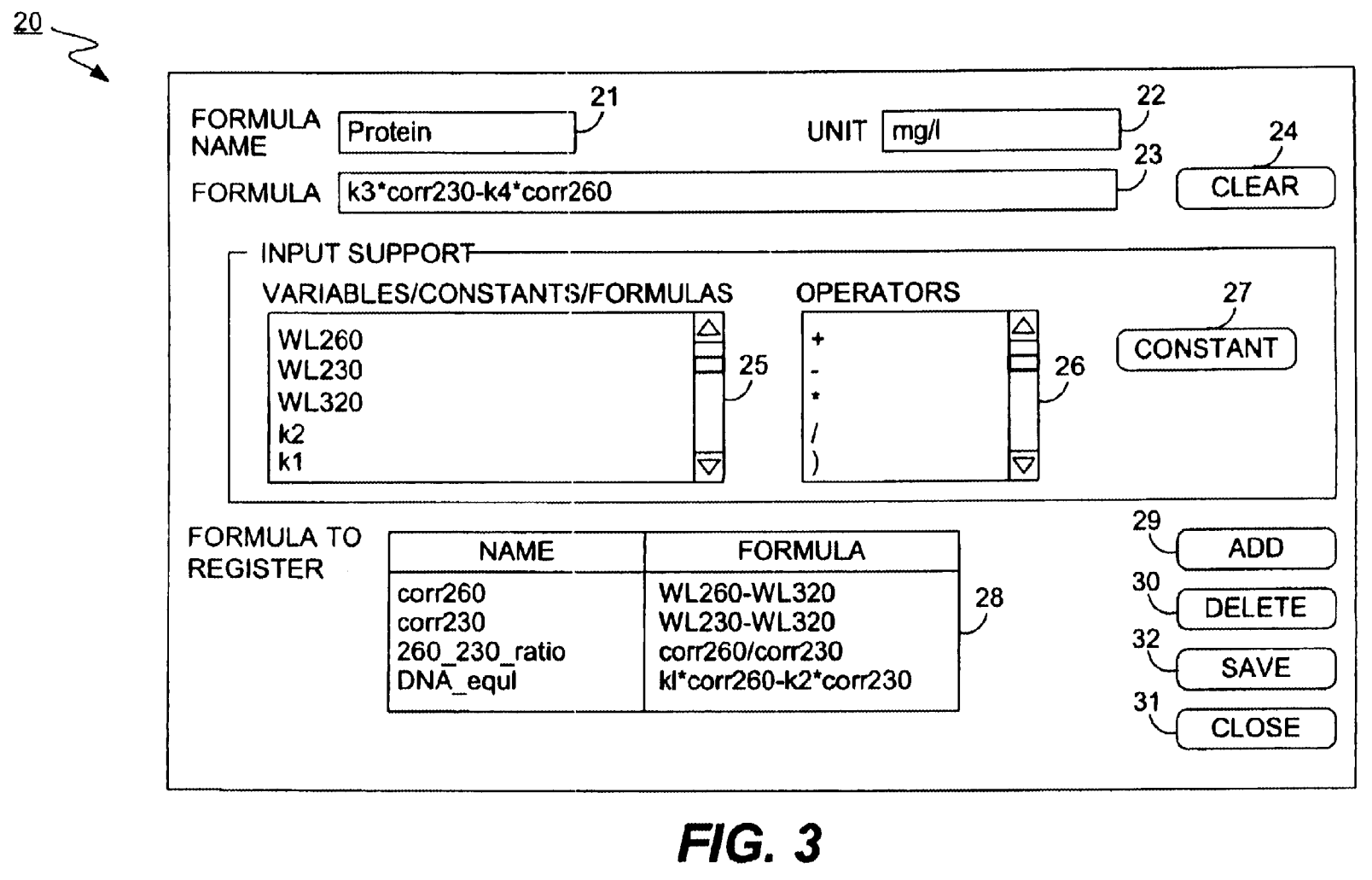
Figure 4:
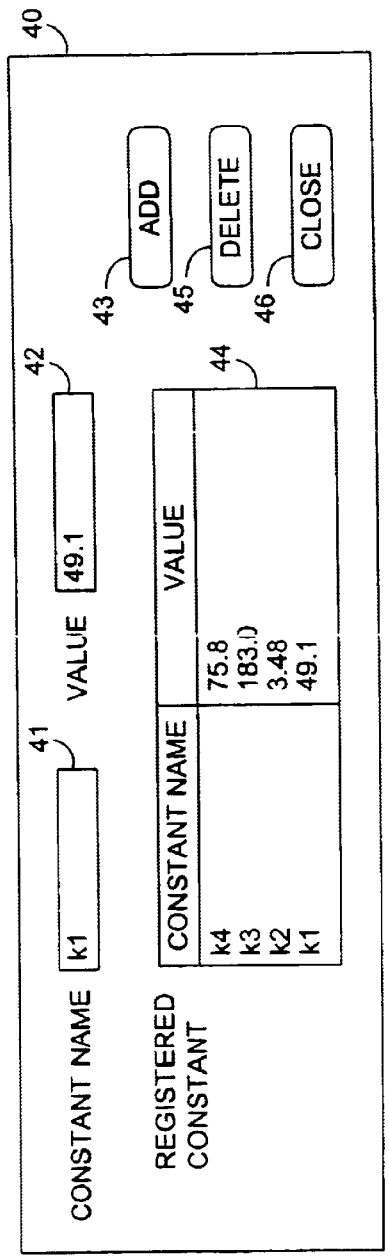
FIG. 4 is a constant registering screen displayed on the output device.

The invention is described next by way of an example with reference to FIGS. 1–7. As shown in FIG. 1, a system 1 for spectrometry according to this invention is comprised not only of a spectrophotometer 2 of a known kind but also a personal computer including an input device 3 (such as a keyboard or a mouse), an output device 4 (such as a CRT or an LCD), a central processing unit (CPU) 5 and memory devices 6 (such as ROM, RAM and HDD). The personal computer has an operating system with an graphical user interface installed and has a specified program run on the operating system so as to serve as a control unit with various functions for spectrometry.

The invention is described next for the case of spectrometrically measuring the concentrations of nucleic acid and protein (respectively $C_n$ and $C_p$) contained in a given sample. Since $C_n$ and $C_p$ (in units of mg/l) are known to be given by the following formulas:

$$C_n = k_1 A_1 - k_2 A_2 \quad (1)$$

$$C_p = k_3 A_2 - k_4 A_1 \quad (2)$$

where $A_1$ and $A_2$ are respectively the absorptivity of the sample at wavelengths 260 nm and 230 nm (with the background absorptivity subtracted), $k_1=49.1$, $k_2=3.48$, $k_3=183.0$ and $k_4=75.8$, spectrometric measurements are carried out at wavelengths 230 nm and 260 nm at which absorptivity is to be determined, as well as at the wavelength (such as 320 nm) at which the background absorptivity is to be determined.

As the user operates the input device 3 in a specified manner to start up a program for spectrometry, a main screen (not shown) is displayed on the output device 4. The main screen includes command buttons and menus allowing the user to click thereon to make use of various functions of the system.

FIG. 2 shows a wavelength setting screen 10 comprising a drop-down list 11 for selecting the method of measurement, two text boxes 12 and 13 for entering the wavelengths at which measurements (say, of absorptivity) are to be taken and the variable name given to the measured value, a radio button 14 for selecting the method of obtaining data, three command buttons (ADD, DELETE and CLOSE) 15–17 and a list box 18 with three fields (wavelength, variable name and measurement method). On the wavelength setting screen 10, the user selects the method of measurement (such as the point method or the scan method) through the drop-down list 11 and enters the value of a desired wavelength (in units of nm) and a variable name respectively in the text boxes 12 and 13. If the ADD button 15 is clicked thereafter, these inputted data are registered in the system and also added into the list box 18. If there are data which have become unnecessary or if an incorrect data entry has been made, these items may be selected in the list box 18 and the DELETE button 16 clicked in order to remove these data from the system and from the list box 18. FIG. 2 shows that wavelengths 230 nm and 260 nm have been selected for the measurement of absorptivity, that variable names "WL230" and "WL260" have correspondingly been registered in the system and that wavelength 320nm has been set under the name "WL320" for the measurement of background absorptivity. The radio button 14 is used for selecting whether the spectrophotometer 2 is used to obtain absorptivity (DEVICE) or it is done manually by the user (MANUAL). After the setting is all completed, the user clicks the CLOSE button 17 to close the wavelength setting screen 10.

FIG. 3 shows a calculation formula preparing screen 20 for allowing the user to prepare various operation expressions (or formulas) by using the variables registered in the system, constants, formulas, functions and operators. In the upper section of the calculation formula preparing screen 20 are text boxes 21, 22 and 23 respectively for entering a name for the formula to be prepared, the unit for the value obtained by the formula and a character array representing the formula itself. A CLEAR button 24 is for clearing the contents of the text box 23. In the middle portion of the calculation formula preparing screen 20 are two list boxes 25 and 26 for giving support to the input of formulas into the text box 23, as well as a command button (CONSTANT) 27. The list box 25 on the left-hand side lists the names of variables, constants and formulas which have been registered in the system. If any of these entries is double-clicked by the mouse, the corresponding name is inserted at the current position of the curser in the text box 23. The list box 26 on the right-hand side is for displaying the operators which may be utilized in the formulas. If any of these operators is double-clicked by the mouse, the double-clicked operator is inserted into the text box 23 at the current position of the cursor.

If the CONSTANT button 27 is clicked, a constant registering screen 40 as shown in FIG. 4 is displayed on the output device 4 for allowing the user to assign names to constants (or coefficients) to be used in the calculation and to register these assigned names. If the user enters a name of a constant and its value respectively into the test boxes 41 and 42 in the upper part of the screen and clicks an ADD button 43, the name and the value of this constant thus entered are registered in the system. If any of the constants already registered and displayed in another list box 44 is selected and a DELETE button 45 is clicked, the selected constant is deleted from the system. FIG. 4 shows the list box 44 showing that the four constants (coefficients) contained in (1) and (2) are registered under the names of k1, k2, k3 and k4. The names of the constants registered through the constant registering screen 40 are displayed in the left-hand list box 25 of the calculation formula preparing screen 20. After the necessary constants are all registered, the user clicks on a CLOSE button 46 to close the constant registering screen 40.

With reference to FIG. 3 again, the lower part of the calculation formula preparing screen 20 includes a list box 28 for displaying the names and the contents of the formulas registered in the system, as well as four command buttons (ADD, DELETE, CLOSE and SAVE) 29–32. If the user clicks on the ADD button 29 after a operation formula is prepared as explained above, its name and content are registered in the system and these data are added in the list box 28. The entry corresponding to any of the formulas in the list box 28 can be deleted if it is selected in the list box 28 and the DELETE button 30 is clicked. The formula names registered in the system are displayed not only in this list box 28 but also in the list box 25 in the middle part of the screen 20. FIG. 3 shows if that the formulas for calculating the absorptivity (values after the background absorptivity has been corrected) at wavelengths 230 nm and 260 nm are registered respectively under the names of "corr230" and "corr260", the formula for calculating the ratio between the two absorptivity values under the name of "260_230_ratio", the formula for calculating the concentration of nucleic acid under the name of "DNA-equ 1", and the formula for calculating the concentration of protein under the name of "Protein". After all formulas have been prepared, the user clicks on the CLOSE button 31 to close the calculation formula preparing screen 20. If the SAVE button 32 is clicked before the calculation formula preparing screen 20 is closed, the data related to the formulas which have been prepared are saved in the memory device 6 in the form of a file.

Spectrometric operations are carried out if the user carries out a certain specified operation on the input device 3 (such as clicking a MEASURE button appearing on the main screen (not shown)) after the formulas have been prepared as described above. After the spectrometric measurements are completed, the system calculates absorptivity at each of the wavelengths 230 nm, 260 nm and 320 nm from the signals received from the spectrophotometer 2 and stores these values in correlation with the three variables "WL230", "WL260" and "WL320". Next, the system analyzes the formulas which have been registered and carries out the calculations represented by them. If any of the variables described above is encountered in this process, the system replaces it with the corresponding absorptivity value to carry out the calculations. After the calculations are completed, the obtained values are stored in correlation with the corresponding formula names. If the name of another formula appears in the analysis of a formula, the calculation is carried out by replacing the formula name by the corresponding value.

After the calculations are all done, the system displays a table 47 as shown in FIG. 5 for showing together the results of the measurement and the results of the calculations. For preparing this table 47, the system forms a field (a column) corresponding to each of the registered variables and formulas. When measurements are made on a plurality of samples under the same conditions, the system adds a data row for each sample. If the output device 4 includes a printer, the table 47 can be printed out by clicking a PRINT button 48. If a SAVE button 49 is clicked, the data displayed in the table 47 are stored in the memory device 6.

Figure 6:
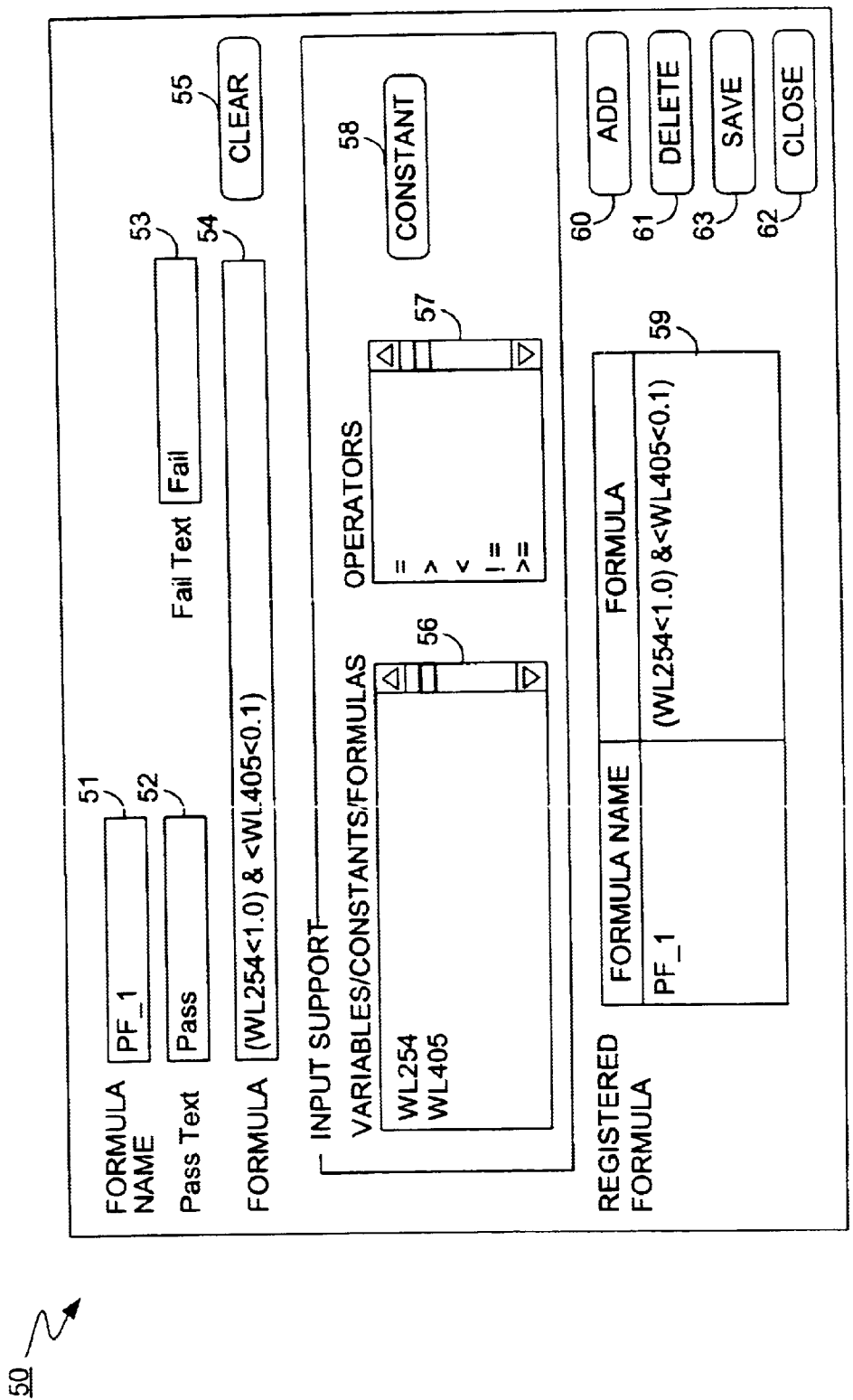
FIG. 6 is a judgment formula preparing screen displayed on the output device.

FIG. 6 shows a judgment formula preparing screen 50 which is structured conveniently for creating a judgment formula for the measured values obtained by the spectrometric measurement, including list boxes 56, 57 and 59, and command buttons (CONSTANT, ADD, DELETE, CLOSE and SAVE) 58 and 60–63 are structured and function similarly to the list boxes 25, 26 and 28 and the command buttons 27 and 29–32 on the calculation formula preparing screen 20 except operators used for comparisons, judgment making and logical operations, rather than arithmetic operators, are displayed in the list box 57.

Consider an application, as an example, wherein the system is used in a spectrometric quality check of ultraviolet filters which have been manufactured. Let us assume that the transmissivity at wavelength 254 nm (T1) of the filters is desired to be less than 1.0% and that at wavelength 405 nm (T2) to be less than 0.1%. For carrying out a check on the filters, the transrnissivity values T1 and T2 for each are measured spectrometrically and only those of the checked filters for which the logical calculation according to the formula given below has TRUE as its result may be considered acceptable:

$$(T1<1.0)\&(T2<0.1) \tag{3}$$

where the ampersand indicates the logical product (AND).

A judgment formula for carrying out such judgment may be prepared, for example, as follows. The user will first register in the system the settings related to measurements at wavelengths 254 nm and 405 nm under the variable names respectively of "WL254" and "WL405" by using the wavelength setting screen 10. These variable names are then displayed in the list box 56 of the judgment formula preparing screen 50, on which the user enters an arbitrary formula name indicative of the judgment formula in the text box 51. Next, the user uses the variable names and the operators displayed in the list boxes 56 and 57 to input the following judgment formula in the text box 54:

$$(WL254<1.0)\&(WL405<0.1) \tag{4}$$

Any character array indicative of "pass" is inputted to the text box ("pass text") 52 and another character array indicative of "fail" is inputted to the text box ("fail text") 53. Thereafter, the user clicks the ADD button 60 to register the judgment formula "PF_1". FIG. 6 shows character arrays "Pass" and "Fail" having been set.

After the judgment formula has thus been created, the user operates the input device 3 in a specified manner to carry out a spectrometric measurement process. After intended spectrometric measurements have been completed, the system obtains transmissivity values at the selected wavelengths (254 nm and 405 nm) on the basis of the signals received from the spectrophotometer 2 and stores them in correlation with the two variables "WL254" and "WL405". Next, the system analyzes the registered judgment formula "PF_1" and judges whether its value comes out to be TRUE or FALSE. If either of these variables appears in the judgment formula during this process, the system carries out the calculation by substituting the variable with the transmissivity value correlated to this variable. The value obtained by the judgment formula is then stored in correlation with the name "PF_1" of the judgment formula.

Figure 7:
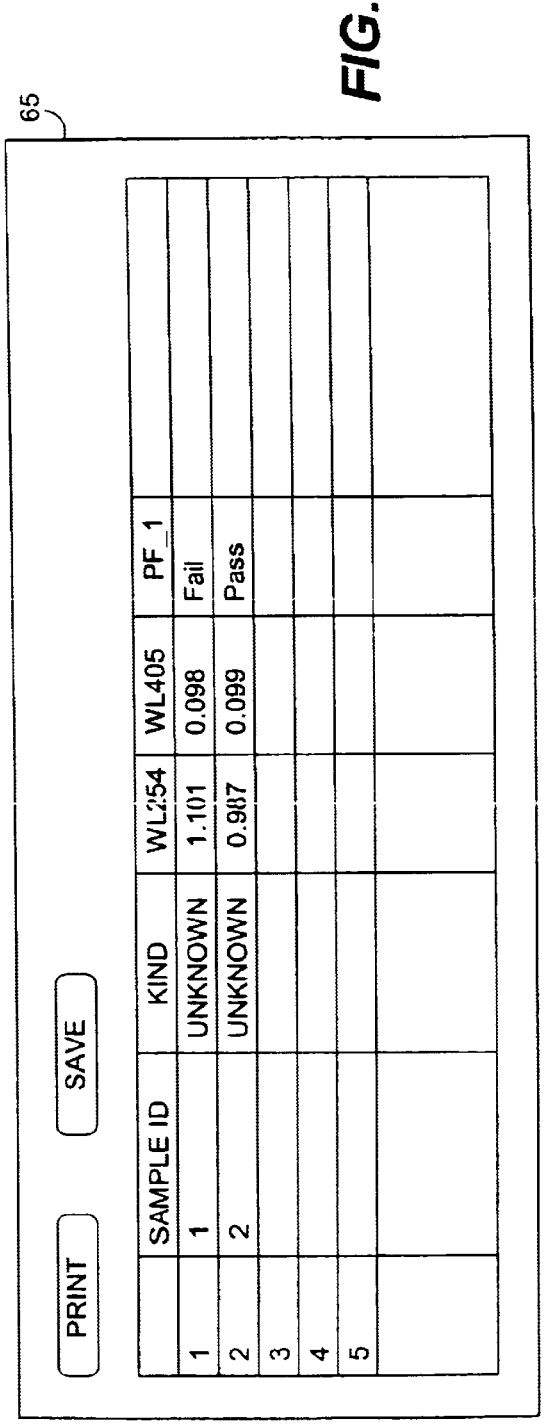
FIG. 7 is a table displaying the results of measurements and judgments.

After a judgment is made, the system displays the result of the measurement and the result of the judgment in a table 65 as shown in FIG. 7. In forming this table 65, the system prepares a field (column) for each of the variables and formulas which have been registered. If measurements are taken on a plurality of samples under the same conditions, the system serves to add a new data row every time a new sample is measured. FIG. 7 shows an example wherein the results of checking on two filters (sample ID=1 and 2) are displayed. For the filter with sample ID=1, the value of variable WL254 exceeds 1.0 and the value of (4) becomes FALSE and hence the value of "PF_1" becomes "Fail". As for the other filter with sample ID=2, the value of (4) becomes TRUE and hence the value of "PF_1" is "Pass".

Although the invention has been described above with reference to only one example but this example is not intended to limit the scope of the invention. Many modifications and variations are possible within the scope of this invention. For example, although an example has been shown wherein calculation and judgment formula preparing screens are separately created, this is not a necessary requirement. The program may be so designed as to define a function of a kind for making judgment commonly used for table calculation software and to use such a function in the text box 23 of the calculation formula preparing screen 20 such that a judgment formula can also be created on the calculation formula preparing screen 20.

As explained above, a system embodying this invention is characterized as being capable of creating various formulas, whenever necessary, such as a calculation formula and a judgment formula using values obtained spectrometrically by the user, thereby obviating the necessity of cumbersome procedures of the prior art technology whereby the user himself/herself had to carry out calculations based on measured data and to make judgments based thereupon, or to transmit measured data into a separate software program for carrying out such processing.

What is claimed is:

1. A system for spectrometry comprising:

an input device for allowing a user to input target wavelengths at which spectrometric measurements are carried out, character arrays representing variables assigned to measured values, and character arrays representing calculation formulas created according to specified rules;

a measuring device for spectrometrically measuring a sample with a spectrophotometer to thereby obtain measured values at said target wavelengths;

a calculating device for analyzing the character arrays representing said calculating formulas and carrying out calculations of said calculating formulas by replacing any of the character arrays representing said variable, if contained in said calculating formulas, each by corresponding one of said measured values; and an output device for outputting results of said calculations;

wherein said input device further allows the user to input character arrays representing said measured values and a character array representing a judgment formula which includes the character arrays representing said measured values, wherein said calculating device further obtains a judgment result by using said judgment formula by replacing any of the character arrays representing said measured values, if contained in said judgment formula, each by corresponding one of said measured values, and wherein said output device further outputs said judgment result.

2. The system of claim 1 wherein said judgment formula further includes logical operations.

* * * * *